UNITED STATES PATENT OFFICE 2,406,912

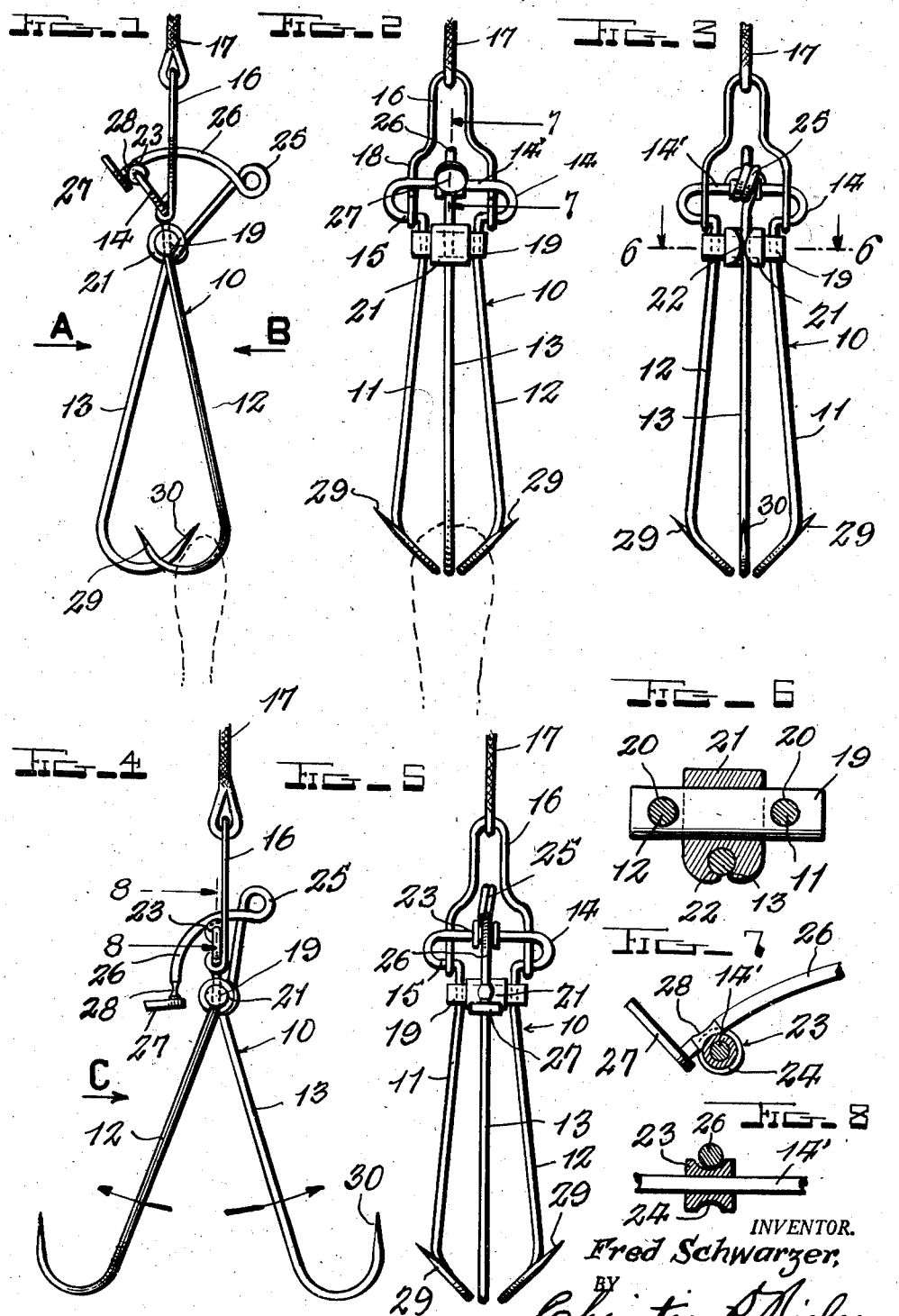

AUTOMATIC FISHHOOK

Fred Schwarzer, Pottstown, Pa.

Application March 7, 1945, Serial No. 581,401

6 Claims. (Cl. 43—36)

This invention relates to fish hooks of an automatic type and it consists in the constructions, arrangements and combinations herein described and claimed.

It is a particular object of the invention to provide a fish hook wherein a plurality of hook devices are employed, swingably mounted under spring tension and movable in opposite directions when the hooks are "struck" by a fish, thereby insuring certainty of retaining the fish on the hooks.

It is also an important object of the invention to provide a fish hook wherein barb elements may be eliminated without impairing the efficiency of the hook, and in which the hooks are so arranged as to securely retain the bait thereon.

A still further object of the invention is the provision of a novel spring catch device for maintaining the hook members in operative set position, yet quickly releasable when struck by a fish.

It is also an object of the invention to provide an automatic hook which may be readily removed from the mouth of a fish.

Additional objects, advantages and features of invention will be apparent from the following description and accompanying drawing, wherein Figure 1 is a side elevation illustrating the hook in set position.

Figure 2 is a front view thereof.

Figure 3 is a rear elevation of the hook in set position.

Figure 4 is a view similar to Figure 1, illustrating the position of the hooks in sprung position.

Figure 5 is a front view thereof.

Figure 6 is a section on the line 6—6 of Figure 3.

Figure 7 is a section on the line 7—7 of Figure 2.

Figure 8 is a section on the line 8—8 of Figure 4.

There is illustrated a fish hook 10 consisting of three hook elements 11, 12, and 13, the hooks 11 and 12 being formed from a strand of steel wire bent intermediate the length thereof to form an elongated eye 14 having oppositely disposed arms 15 for swingably mounting a bail 16 by means of which a line 17 may be secured. The bail 16 includes respective legs 18, the free ends of which are formed as eyelets through which the arms 15 are extended.

Upon the shank portions of the hooks 11 and 12 there is a bar 19, which as may be seen in Figure 6, is formed with respective openings 20 through which the shanks of the hooks 11 and 12 are frictionally fitted. The bar 19 maintains the hooks in spaced relation and occupies a position immediately below the arms 15. Upon the bar 19 there is an oscillatable block 21, upon one side of which there is a vertically extended slot 22 within which the shank of the hook 13 is disposed, the edges of the slot being peened or upset upon the shank for its retention, as may be seen in Figure 6. The hook 13 is thus oscillatable upon the bar, permitting the hooks to swing in opposite directions under spring action, as will be described.

A roller 23 is mounted on the horizontal bar 14′ of the eye 14, the roller having a peripheral groove 24 aligned with the slot 21 for a purpose presently to be explained.

The shank of the hook 13 extends a substantial distance beyond the roller 23 and has formed therein a double coil spring 25, the terminal portion 26 beyond the coils being arcuate shaped and adapted to travel within the groove 24 of the roller 23. A button 27 is fixed upon the end of the portion 26 and inwardly thereof an arcuate shaped kerf 28 is formed having a contour corresponding to the base of the groove 24, as may be seen in Figure 8.

The hook portions 29 of the hooks 11 and 12 are disposed divergently outward from the longitudinal axis of the hook, and the hook portion 30 of the hook 13 is straight which in the set position is disposed between the hook portions 29 in close relation, so that bait placed on the hooks 29 will be impinged upon the hook portion 30 and firmly secure the bait.

With the hook 10 set as shown in Figures 1, 2 and 3, the terminal portion 26 is under tension due to the spring 25, the hooks 11, 12 and 13 being held against swinging movement by reason of engagement of the kerf 28 with the roller 23. However, when a fish strikes the hooks, pressure will be exerted upon the shanks of the hooks as indicated at A and B, Figure 1, thereby releasing the kerf from the roller, allowing the hooks 11 and 12 to forcibly swing in one direction and the hook 13 to move in the opposite direction, as indicated by the arrows in Figure 4.

To set the hook, the bail 16 lies flush against the eye 14, as in Figure 4, and by placing the index finger upon the bail and the thumb upon the button 27, pressure can be exerted so as to move the hooks toward each other until the kerf 28 comes to rest within the roller 23. Or, if desired, pressure may be exerted upon the shanks as indicated at C, the final movement being imparted by pressure upon the button 27.

The hooks may be released from the mouth of a fish by exerting a quick downward motion and at the same time exerting pressure upon the shanks, tending to move the hooks to a set position.

While I have shown and described a preferred form of the device, this is by way of illustration only, and I consider as my own all such modifications in construction as fairly fall within the scope of the appended claims.

I claim:

1. An automatic fish hook comprising a strand of spring wire bent intermediately the length thereof to form an elongated eye and a pair of hook members, a swinging hook member mounted between said pair of hook members, including spring means for tensioning said hook member, said swinging hook member having a terminal upper end adapted to engage a portion of the wire forming said eye, for holding the swinging hook normally between said pair of hooks, but releasable upon application of pressure on said hooks.

2. An automatic fish hook comprising a strand of spring wire bent intermediate the length thereof to form an elongated eye having a horizontal bar portion and a pair of hook members, a hook member disposed between said pair of hook members and swingably mounted therebetween, said swinging hook having an arcuate terminal portion overlying said horizontal bar, catch means between said bar and the arcuate terminal portion and said swinging hook having spring means for tensioning the same and maintain the catch in operative position and said swinging hook between said pair of hooks, and a bail member swingably connected to said eye.

3. The structure of claim 2 in which the terminal end of the arcuate portion of the swinging hook includes a button to facilitate movement of the swinging hook to operative position.

4. An automatic fish hook comprising a strand of spring wire bent intermediate the length thereof to form an elongated eye having an upper horizontal portion and a pair of oppositely disposed arms, a hook member integrally formed with each of said arms, a bar member connected between said hook members beneath said arms, an oscillatable block on said member, a hook fixed to said block and swingable between said first named hook members, said swingable hook having an upper arcuate shaped extension disposed above said upper horizontal bar portion of the eye and including a coiled spring tending to move said extension toward said horizontal portion, a roller on the horizontal portion having a groove adapted to receive the arcuate extension therewithin, the terminal end of said arcuate extension having a button fixed thereto and said extension having a kerf adapted to engage the groove of said roller and releasably maintain the swinging hook between said first named hooks.

5. The structure of claim 4, in which a bail member is swingably mounted on the oppositely disposed arm members adapted to contact the horizontal portion under released action of the hooks.

6. An automatic fish hook comprising a strand of spring wire bent intermediately the length thereof to form an eye and a pair of hook members, a swinging hook member mounted between said pair of hook members including spring means for tensioning said hook member, and means on said strand of spring wire cooperable with the spring means of the swinging hook for holding the latter normally between said pair of hooks, but releasable upon application of pressure on said hooks.

FRED SCHWARZER.